(12) United States Patent
Garg et al.

(10) Patent No.: US 7,685,677 B2
(45) Date of Patent: Mar. 30, 2010

(54) SINGLE POINT HINGE FOR A CONTAINER

(75) Inventors: Satya Garg, St. Louis, MO (US); Brent Riales, Paragould, AR (US); David Smith, Marmaduke, AR (US); Tim Cimmerer, Paragould, AR (US)

(73) Assignee: Anchor Packaging, Inc., St. Louis, MO (US)

( * ) Notice: Subject to any disclaimer, the term of this patent is extended or adjusted under 35 U.S.C. 154(b) by 0 days.

(21) Appl. No.: 11/821,407

(22) Filed: Jun. 22, 2007

(65) Prior Publication Data
US 2008/0034538 A1    Feb. 14, 2008

Related U.S. Application Data

(62) Division of application No. 10/641,671, filed on Aug. 15, 2003, now Pat. No. 7,246,714.

(51) Int. Cl.
*E05D 1/00* (2006.01)
(52) U.S. Cl. .................................... 16/225; 16/DIG. 13
(58) Field of Classification Search .................. 16/225, 16/DIG. 13, 385; 220/839, 836, 4.21–4.24
See application file for complete search history.

(56) References Cited

U.S. PATENT DOCUMENTS

| | | | |
|---|---|---|---|
| 2,084,084 A | 6/1937 | Greer | |
| 2,207,210 A | 7/1940 | Von Knauf | |
| 2,814,381 A | 11/1957 | Stevick | |
| 2,845,104 A | 7/1958 | Frankel | |
| 2,885,108 A | 5/1959 | Donoghue | |
| 2,915,214 A | 12/1959 | Frankel | |
| 3,043,354 A | 7/1962 | Fitzgerald | |
| 3,082,903 A | 3/1963 | Stevens | |
| 3,090,537 A | 5/1963 | Pasciak | |
| 3,186,574 A * | 6/1965 | Davidson | 16/225 |
| 3,447,199 A | 6/1969 | Trimble | |
| 3,511,433 A | 5/1970 | Andrews | |
| 3,551,940 A * | 1/1971 | Edison | 16/225 |
| 3,616,487 A | 11/1971 | Dearth | |
| 3,620,411 A * | 11/1971 | Rump | 220/315 |
| 3,710,975 A * | 1/1973 | Jansen | 206/456 |
| 3,912,118 A | 10/1975 | Bird | |
| 3,937,389 A | 2/1976 | Wind | |
| 4,208,006 A | 6/1980 | Bixler | |

(Continued)

OTHER PUBLICATIONS

Micro Raves from Anchor Packaging, May 2000.

(Continued)

*Primary Examiner*—Victor Batson
*Assistant Examiner*—Jeffrey O'Brien
(74) *Attorney, Agent, or Firm*—Gallop, Johnson & Neuman, L.C.

(57) ABSTRACT

A single point hinge and a method of thermoforming a plastic container including a single point hinge include a lid, a tray, a single point hinge connecting the lid and the tray. The single point hinge includes an angle formed by a lid chamfer and a tray chamfer. The single point hinge further includes a lid well adjacent to the lid chamfer and a tray well ajdacent to the tray chamfer, and the lid connects to the lid well and the tray connects to the tray well.

10 Claims, 13 Drawing Sheets

U.S. PATENT DOCUMENTS

| | | | |
|---|---|---|---|
| 4,240,544 A | 12/1980 | Barnhart et al. | |
| 4,244,470 A | 1/1981 | Burnham | |
| 4,273,249 A | 6/1981 | Florian | |
| 4,538,731 A * | 9/1985 | Cillario | 206/540 |
| 4,563,561 A | 1/1986 | Vaeth et al. | |
| 4,583,348 A | 4/1986 | Treiber et al. | |
| 4,636,065 A | 1/1987 | Kanemitsu et al. | |
| 4,660,716 A | 4/1987 | McMahon et al. | |
| 4,703,853 A * | 11/1987 | Byrns | 206/387.13 |
| 4,705,172 A | 11/1987 | Gage | |
| 4,705,588 A | 11/1987 | Treiber | |
| 4,753,351 A | 6/1988 | Guillin | |
| 4,844,263 A | 7/1989 | Hadtke | |
| D305,409 S | 1/1990 | Michaud et al. | |
| D307,395 S | 4/1990 | Borst | |
| 4,958,479 A | 9/1990 | Treiber | |
| 4,993,583 A * | 2/1991 | Chasen | 220/482 |
| 5,012,061 A | 4/1991 | Lesser | |
| 5,016,777 A | 5/1991 | Marvin | |
| 5,046,659 A | 9/1991 | Warburton | |
| 5,092,479 A * | 3/1992 | Wells | 220/4.23 |
| 5,114,766 A | 5/1992 | Jacques | |
| 5,131,551 A * | 7/1992 | Wells | 220/4.23 |
| 5,145,068 A | 9/1992 | Schmitz et al. | |
| D334,141 S | 3/1993 | Gottofredi | |
| 5,236,119 A | 8/1993 | Chu | |
| D339,744 S | 9/1993 | Seppala | |
| 5,242,696 A | 9/1993 | McDevitt | |
| 5,259,170 A | 11/1993 | Tolson | |
| 5,269,430 A | 12/1993 | Schlaupitz et al. | |
| D342,896 S | 1/1994 | Gottofredi | |
| 5,310,981 A | 5/1994 | Sarnoff et al. | |
| 5,335,787 A | 8/1994 | Finchum et al. | |
| 5,339,973 A | 8/1994 | Edwards et al. | |
| D352,454 S | 11/1994 | Krupa | |
| 5,363,978 A | 11/1994 | Molo | |
| 5,377,860 A | 1/1995 | Littlejohn et al. | |
| 5,381,901 A | 1/1995 | Hundley | |
| 5,387,781 A | 2/1995 | Berkoff | |
| 5,519,195 A | 5/1996 | Keefer et al. | |
| 5,584,409 A | 12/1996 | Chemberlen | |
| 5,586,677 A * | 12/1996 | Foos | 220/260 |
| 5,603,198 A | 2/1997 | Rimondi | |
| 5,607,709 A | 3/1997 | Fritz et al. | |
| D388,324 S | 12/1997 | Bonnard | |
| D388,699 S | 1/1998 | Hayes et al. | |
| 5,705,213 A | 1/1998 | Guillin | |
| 5,747,084 A | 5/1998 | Cochran et al. | |
| 5,750,967 A | 5/1998 | Sprauer, Jr. | |
| D398,847 S | 9/1998 | Wyslotsky et al. | |
| 5,806,703 A | 9/1998 | Grandi | |
| D400,099 S | 10/1998 | Brauner | |
| 5,860,549 A | 1/1999 | Allers et al. | |
| D407,014 S | 3/1999 | McCann | |
| 5,877,719 A | 3/1999 | Edwards | |
| 5,887,749 A | 3/1999 | Schommer et al. | |
| 5,897,011 A | 4/1999 | Brilliant et al. | |
| 5,938,068 A | 8/1999 | Atkins et al. | |
| 6,119,862 A | 9/2000 | Childress | |
| D432,867 S | 10/2000 | Oravez | |
| 6,152,299 A * | 11/2000 | O'Malley et al. | 206/349 |
| 6,189,725 B1 | 2/2001 | Monico | |
| 6,259,079 B1 | 7/2001 | Ji et al. | |
| 6,293,692 B1 | 9/2001 | Bowsher et al. | |
| 6,554,147 B1 | 4/2003 | Maida et al. | |
| 6,572,909 B1 | 6/2003 | Bagwell et al. | |
| 6,574,834 B2 * | 6/2003 | Fedon | 16/225 |
| 6,651,813 B2 | 11/2003 | Vallans et al. | |
| 7,246,714 B2 | 7/2007 | Garg et al. | |
| 2003/0168451 A1 | 9/2003 | Bohrer | |
| 2004/0007583 A1 | 1/2004 | Lin | |
| 2005/0035118 A1 | 2/2005 | Garg et al. | |
| 2008/0023882 A1 | 1/2008 | Garg et al. | |

OTHER PUBLICATIONS

Co-pending U.S. Appl. No. 11/821,321, filed Jun. 22, 2007 plus Office Action issued Dec. 9, 2008.

Office action issued in co-pending U.S. Appl. No. 11/821,429.

* cited by examiner

SINGLE POINT HINGE FOR A CONTAINER

CROSS REFERENCE TO RELATED APPLICATION

This Application is a divisional of U.S. patent application Ser. No. 10/641,671, now U.S. Pat. No. 7,246,714, filed Aug. 15, 2003 issue date Jul. 24, 2007. The entire content of that application is incorporated herein by reference.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

The present invention relates to a single point hinge for plastic containers and a method of manufacturing the single point hinge.

BACKGROUND OF THE INVENTION

Restaurant and food-related industries demand plastic containers for food storage and transportation that are economical to purchase, effective in preserving food, effective in containing the food and its related moisture, attractive to the consumer, and easy to operate. One of the most important features for hinged plastic containers is the hinge design, which is critical to many of the above-described performance characteristics.

Prior art hinge designs include a "box hinge" shown in FIG. 1(A), a "W" hinge shown in FIG. 1(B), a two-point hinge shown in FIG. 1(C), a three-point hinge shown in FIG. 1(D), and a cylindrical hinge shown in FIG. 1(E). These prior art hinges are unacceptable for many reasons. For example, the box hinge is difficult to thermoform with its many sharp angles. And, due to the draw ratio of the box hinge, the resulting box hinge is often malformed. It is also often difficult to form a box hinge using polypropylene, a plastic material preferred in many plastic container applications.

The "W" hinge is difficult to consistently form owing to its many sharp angles. The depth of the "W" hinge is larger than the width of either of its side portions. The "W" hinge may also retain too much "memory" and may tend to close by itself. The memory of plastic containers refers to the inherent tendency of the plastic container to return to its determined position. For example, a container with too much memory may tend to automatically close when opened, much to the disgust of the end user, who could be attempting to remove the contents of the container or eat from the container. It is preferred that a container, once opened, will remain opened, and that a container, once closed, will remain closed.

The two-point and three-point designs are also more difficult to consistently form during manufacturing as they have multiple compression points. A complicated manufacturing process results in a higher percentage of product not meeting quality specifications or consumer expectations.

The more complicated hinge designs, such as the two-point, three-point, and "W" are difficult to form consistently. Many plastic containers are made by a thermoforming process, which only allows a few seconds to form the hinge. Thus, it is imperative that the hinge may be quickly and accurately formed.

The cylindrical hinge shown in FIG. 1(E) involves a coining process during manufacturing. The manufacturing of the cylindrical hinge involves a coining process. Coining processes generally involve the thinning of a plastic material at desired location(s). The coining of the cylindrical hinge may be accomplished using the compression force supplied by the forming press. If the cylindrical hinge is squeezed too much, a weakened, overly coined area may result in the hinge and cause product failure, i.e., the lid of the container tears away from the tray of the container at the hinge. Previous attempts to improve the manufacturing process of the cylindrical hinge have incorporated a revised cylindrical shape that leaves areas of a thicker plastic material along the coined region for reinforcement. The coined region of the cylindrical hinge is shown by reference numeral 2 and the reinforcing region is shown by reference numeral 4.

Other disadvantages of prior art hinges include poor closure of the container near the hinge. Poor closure of the container may result in leakage. The closure of the container near the hinge is especially susceptible to poor closure due to the physical proximity of the hinge to the locking profile of the container.

Another disadvantage of the prior art involves "narrow" windows for process operation. Many prior art containers require exacting specifications that may prove difficult for the manufacturer to economically meet and may result in considerable waste due to unacceptable product.

SUMMARY OF THE INVENTION

The present invention is directed to a plastic container with a singe point hinge and a method of thermoforming both the plastic container and the single point hinge. The plastic container may include a lid, a tray, and a single point hinge that connects the lid and the tray. The single point hinge includes an angle formed by a lid chamfer and a tray chamfer. The single point hinge further includes a lid well adjacent to the lid chamfer and a tray well adjacent to the tray chamfer. The lid connects to the lid well, and the tray connects to the tray well.

Aspects of the present invention resulting in advantages over the prior art include:

The present invention provides a hinge for a plastic container that provides positive closure. The single point hinge of the present invention is easier to manufacture than many prior art hinges.

The single point hinge is easy to form consistently as the process window is opened to a wider range of tolerances resulting in increased flexibility in the manufacturing process.

The single point hinge helps clear interference near the hinge and promotes secure closing.

The single point hinge requires less manufacturing steps than many prior art hinges.

The single point hinge exhibits a lack of memory that is preferred by consumers. A lid incorporating a single point hinge will tend to stay open or closed depending on which side of 90° (i.e., halfway between open and closed) the lid is located.

These and other aspects of the present invention are achieved herein.

DETAILED DESCRIPTION OF THE INVENTION

The present invention is directed to a plastic container with a singe point hinge and a method of thermoforming both the plastic container and the single point hinge. The plastic container may include a lid, a tray, and a single point hinge that connects the lid and the tray. The single point hinge includes an angle formed by a lid chamfer and a tray chamfer. The single point hinge has a thinned region at the angle formed by the lid chamfer and the tray chamfer. The single point hinge further includes a lid well adjacent to the lid chamfer and a tray well adjacent to the tray chamfer. The lid connects to the lid well, and the tray connects to the tray well. The lid well and the tray well assist the single point hinge to function properly by inhibiting interference from other parts of the plastic container or the single point hinge itself.

In one embodiment of the present invention, the lid well and the tray well may each include a horizontal surface substantially perpendicular to two vertical surfaces. The vertical surfaces of the lid well and tray well are substantially parallel to each other. The horizontal surface is connected to the two vertical surfaces and is in between the two vertical surfaces. In a preferred embodiment, the horizontal surface is longer than either of the two vertical surfaces.

In another embodiment of the present invention, the corners between the horizontal surface and vertical surfaces of the lid well and tray well form radii.

In another embodiment of the present invention, the vertical surfaces of the lid and tray wells are at angle of approximately 75° to approximately 105° to the horizontal surface of the lid and tray wells.

The lid, tray, and the single point hinge may be thermoformed from the same sheet of plastic material. The single point is formed by the two chamfers in the thermoforming process. The single point forms an angle between the two chamfers. A region around the single point is also thinned during the thermoforming process to a thinner thickness than the remainder of the plastic material.

Figure 1A:
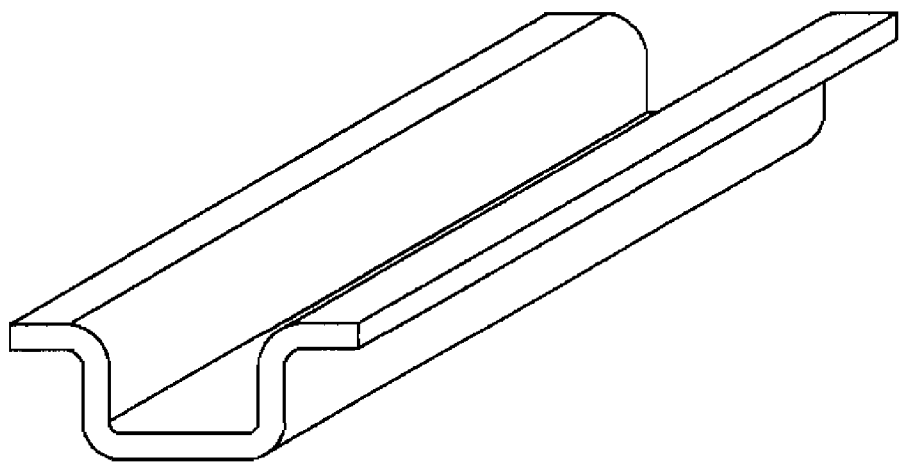
FIG. 1(A) shows an example of a "box" hinge.
Figure 1B:
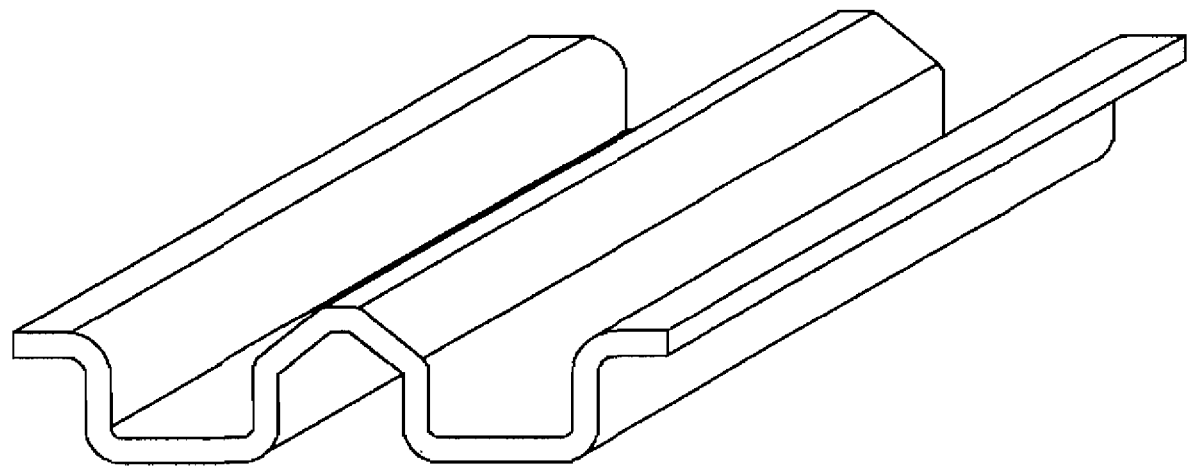
FIG. 1(B) shows an example of a "W" hinge.
Figure 1C:
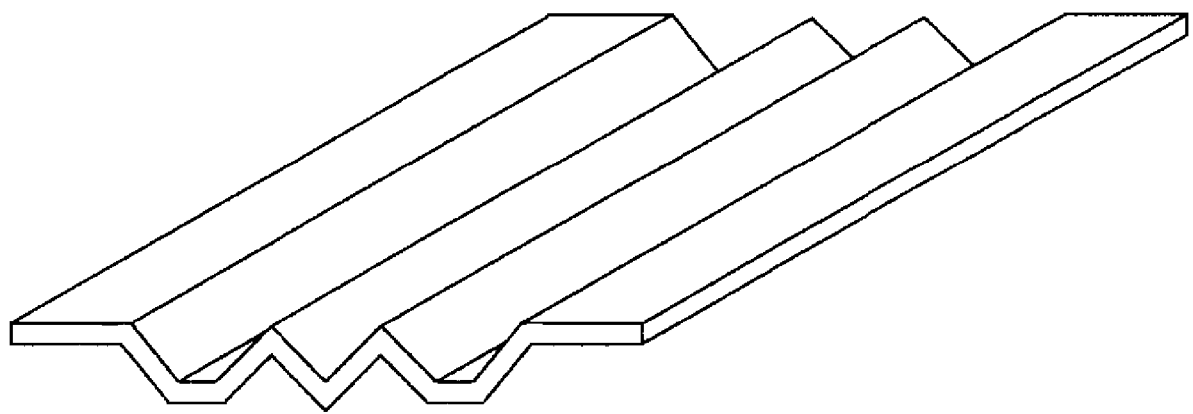
FIG. 1(C) shows an example of a two-point hinge.
Figure 1D:
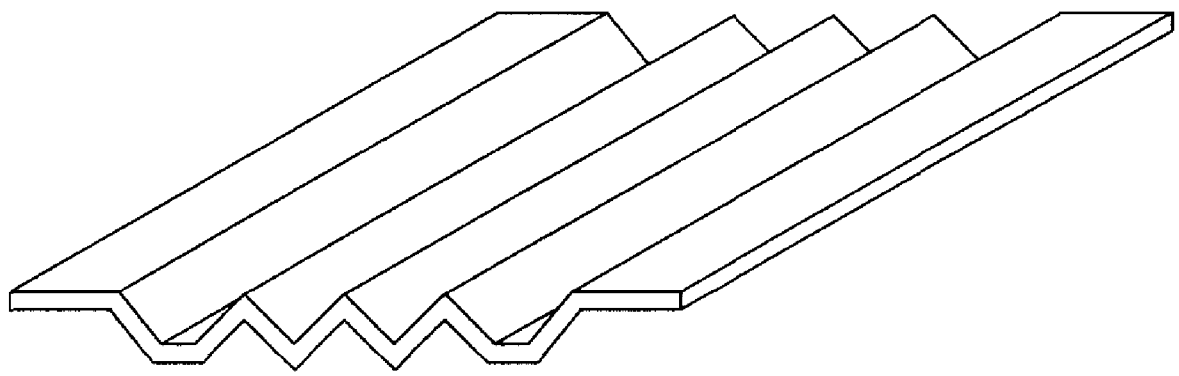
FIG. 1(D) shows an example of a three-point hinge.
Figure 1E:
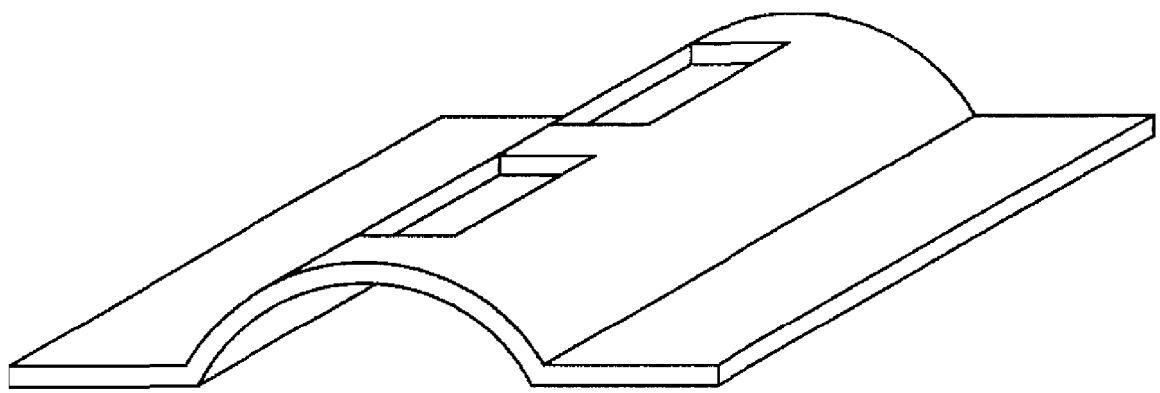
FIG. 1(E) shows an example of a cylindrical hinge.
Figure 2:
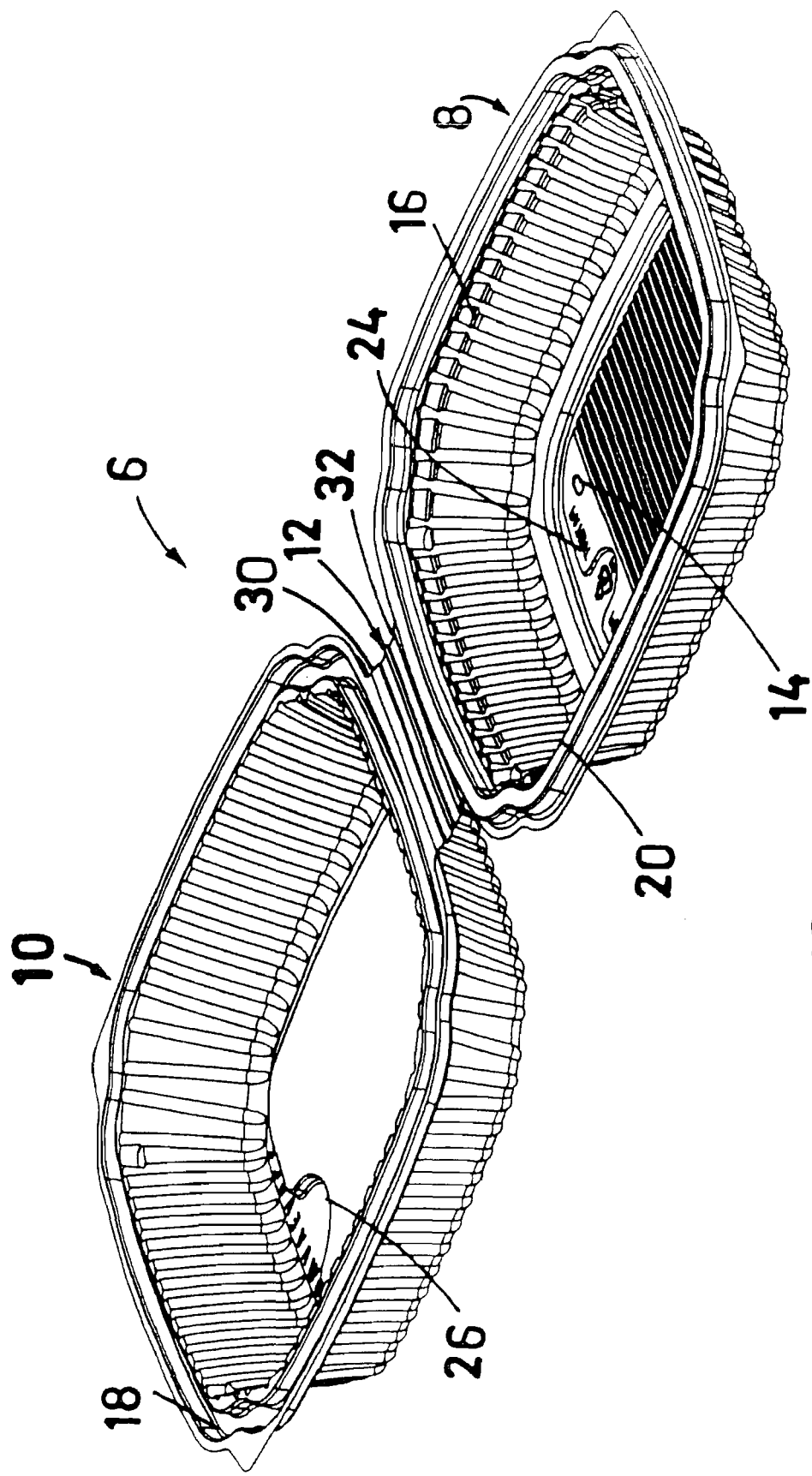
FIG. 2 shows a perspective view of a plastic container incorporating the single point hinge of the present invention.
Figure 3:
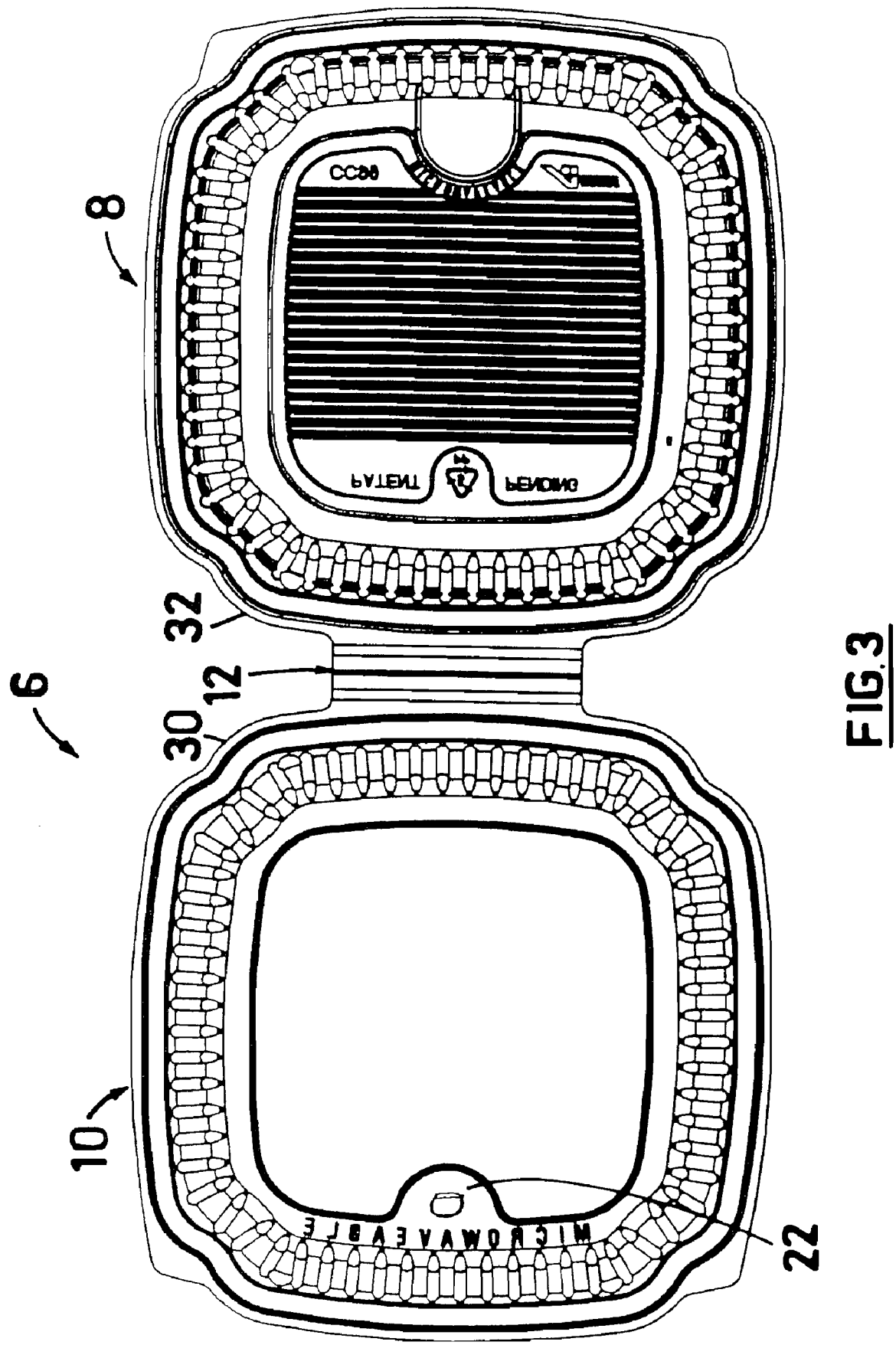
FIG. 3 shows a top down view of the plastic container, in an open position, incorporating the hinge of the present invention.
Figure 4:
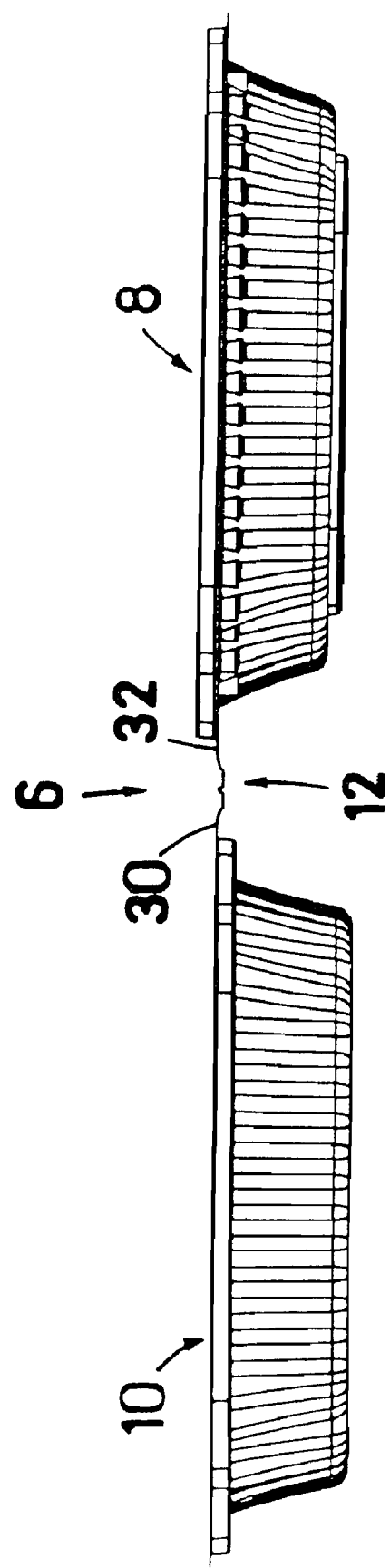
FIG. 4 shows a side view of the plastic container, in an open position, incorporating the single point hinge of the present invention.

A single point hinge of the present invention may be used in a plastic container such as the plastic container shown in FIGS. 2-4. Of course, the present invention is not limited to the plastic container shown in the FIGURES. The single point hinge of the present invention may be used with a variety of plastic containers for many different applications.

Turning to FIGS. 2-4, a plastic container 6 includes a tray 8 and a lid 10. The tray 8 and the lid 10 are connected by a hinge 12 across a lid trim flange 30 and a tray trim flange 32. Typically, the plastic container 6 is formed by thermoforming, and the tray 8, the lid 10, and the hinge 12 are made from one sheet of plastic material.

The tray 8 defines a cavity 14 for containing food items. Fill lines 16 in the tray 8 may conveniently show volumetric measurements in the cavity 14.

The lid 10 and the tray 8 may be securely closed by interlocking a female locking rim 18 and a male locking rim 20.

A vent 22 provides for the venting of steam to maintain fried food items crisp and to prevent the saturation of other food items from contained moisture. The vent 22 also reduces the likelihood of over-expansion of the plastic container 6 during heating. Depressions 24 in the tray 8 may also interlock with protrusions 26 on the lid 10. This interlocking arrangement improves the stackability of the plastic container 6 with another plastic container. The arrangement of the depressions 24 and protrusions 26 also allow for venting through vent 22 even when plastic container 6 is in a stacking arrangement with other plastic containers.

Figure 5:
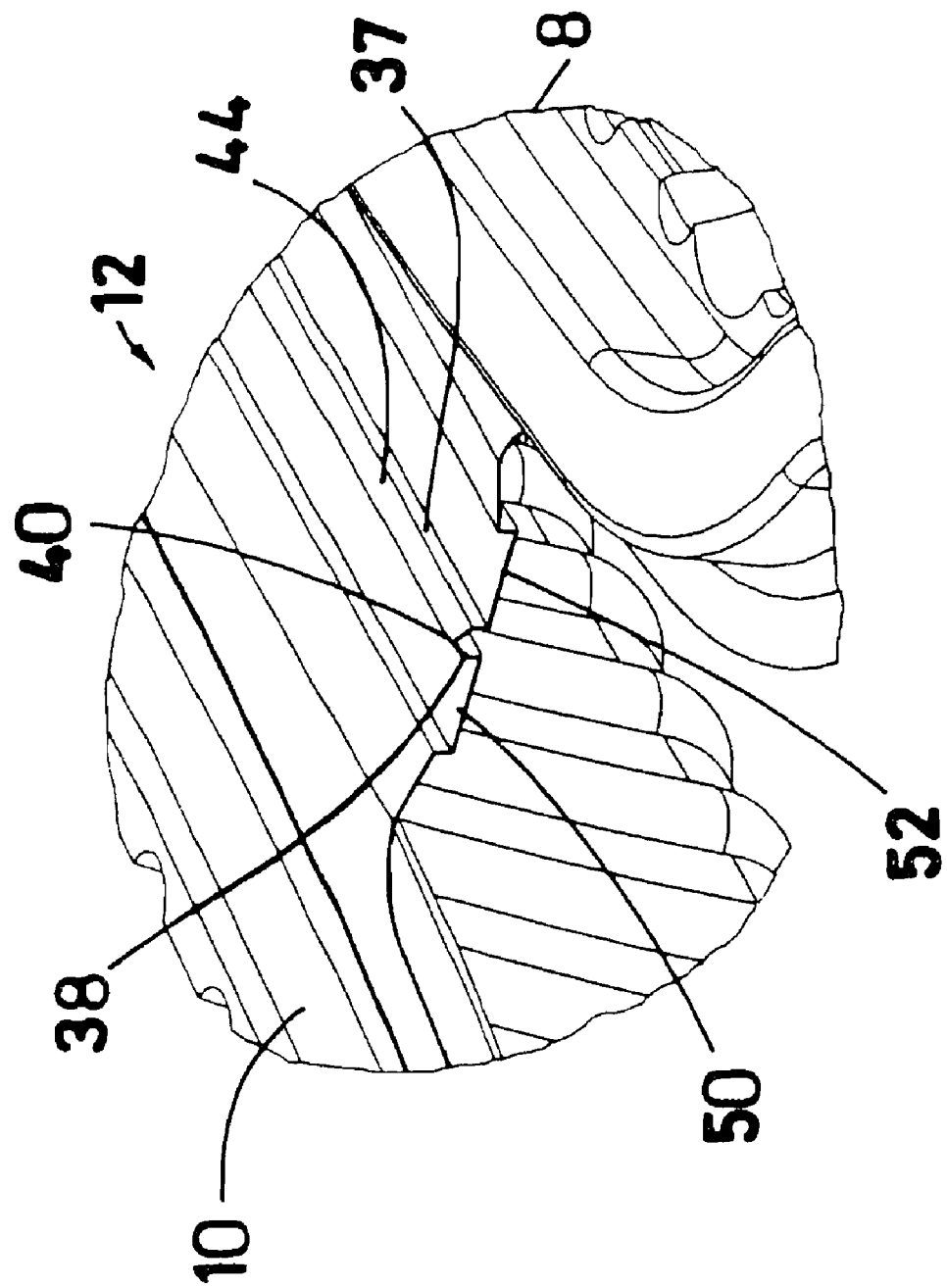
FIG. 5 shows a perspective view of the single point hinge of the present invention.
Figure 6:
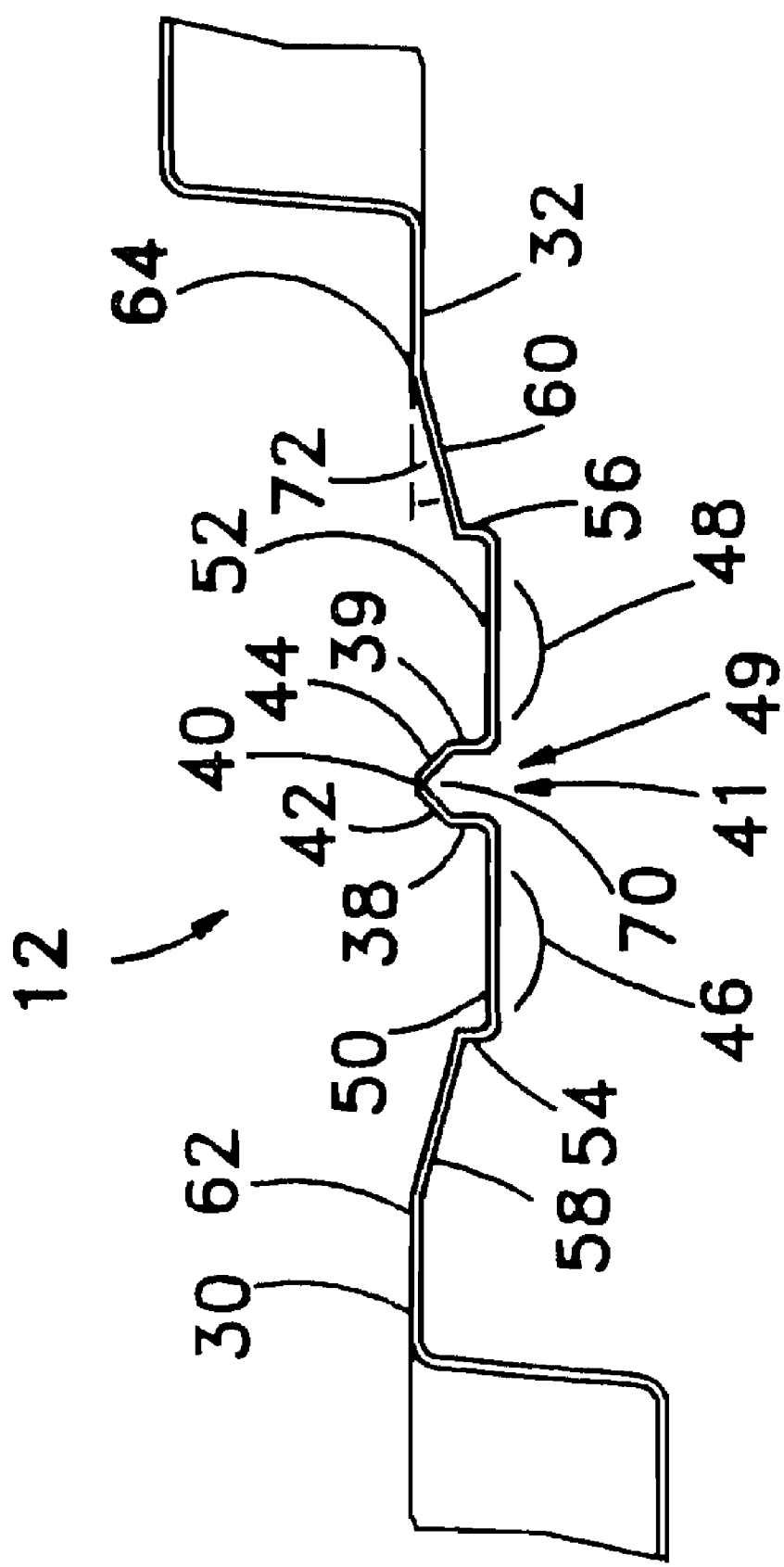
FIG. 6 shows a side view of the single point hinge of the present invention.

Turning now to FIGS. 5-7, an example of a single point hinge of the present invention is shown. The single point hinge 12 connects the tray 8 and the lid 10. The term "connects" as used herein refers to the joining of the tray 8 and the lid 10 by an integral section of plastic, i.e., one piece of plastic. The tray 8, the lid 10, and the hinge 12 are generally made from the same sheet of plastic material and are not joined or attached together from several independent pieces of plastic. Instead, the tray 8, the lid 10, and the hinge 12 are thermoformed from the same sheet of plastic in molds.

The single point hinge includes a hinge point 40. A lid chamfer 42 and a tray chamfer 44 are adjacent to the hinge point 40. A point angle 41 is formed between the lid chamfer 42 and the tray chamfer 44. The point angle 41 may range from approximately 60° to approximately 120°. In a preferred embodiment, the point angle 41 is approximately 90°. Hinge operation will be less dependable outside of either range.

A lid vertical portion 38 is connected to the lid chamfer 42. A tray vertical portion 39 is connected to the tray chamfer 44. The lid and tray vertical portions 38, 39 and the chamfers 42, 44 substantially define a point space 49 that is evident when the hinge 12 is in an "open" position. An outline of the point space 49 is somewhat in the shape of a triangle (formed by the chamfers 42, 44) on the top of a square (formed by lid and tray vertical portions 38, 39).

A lid well 46 and a tray well 48 are formed on both sides of the point space 49. The lid well 46 is formed by the lid vertical portion 38, a lid horizontal well portion 50 and a lid vertical well wall 54. A tray well 48 is formed by the tray vertical portion 39, a tray horizontal well portion 52, and a tray vertical well wall 56. The horizontal well portions 50 and 52 are generally longer that either the vertical portions 38, 39 or the vertical well walls 54, 56. It is preferred that the vertical well walls 54, 56 have an angle of approximately 75° to approximately 105° to the horizontal well portions 50, 52. In a most preferred embodiment, the vertical well walls 54, 56 have an angle of approximately 90° to the horizontal well portions 50, 52.

In a preferred embodiment, the lid trim flange 30 and the tray trim flange 32 are substantially parallel to the horizontal well portions 50, 52.

A lid well transition 58 and a tray well transition 60 connect to the lid and tray vertical well walls 54 and 56, respectively. The lid well transition 58 and the tray well transition 60 connect to the lid trim flange 30 and the tray trim flange 32 at a lid trim transition point 62 and a tray trim transition point 64.

The lid trim flange 30 and the tray trim flange 32 generally form a flange angle 72 of approximately 15° to approximately 25° to the lid well transition 58 and the tray well transition 60. In a most preferred embodiment the flange angle 72 is approximately 15°.

Figure 7A:
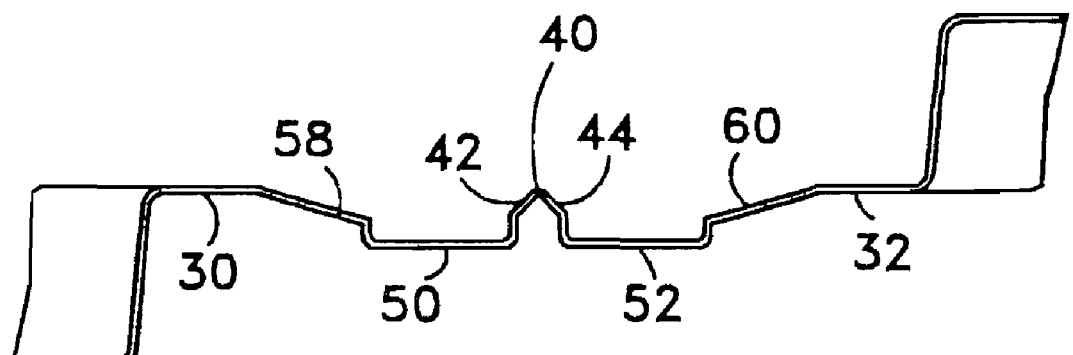
FIG. 7(A) is a close-up view of the single point hinge of the present invention.
Figure 8A:
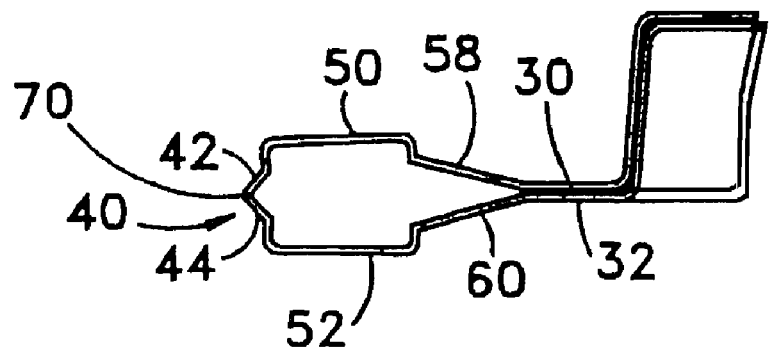
FIG. 8(A) shows the single point hinge of the present invention in a "closed position."

FIGS. 7(A) and 8(A) show a single point hinge of the present invention in an "opened" and "closed" position. The single point hinge of FIGS. 7(A) and 8(a) show an embodiment with some corners forming radii.

Figure 7B:
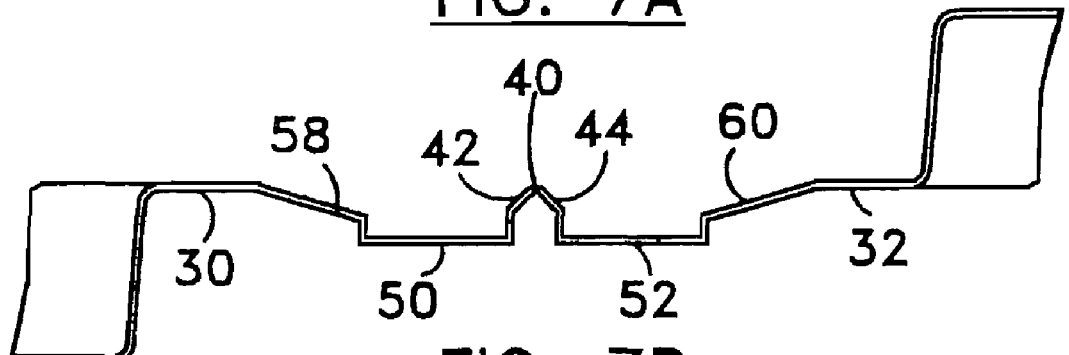
FIG. 7(B) is a close-up view of the single point hinge of the present invention with some corners forming radii.
Figure 8B:
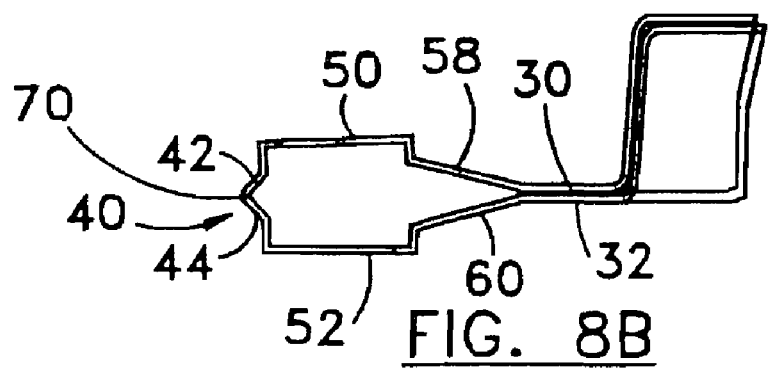
FIG. 8(B) shows the single point hinge of the present invention with radii corners in a "closed position."
Figure 9A:
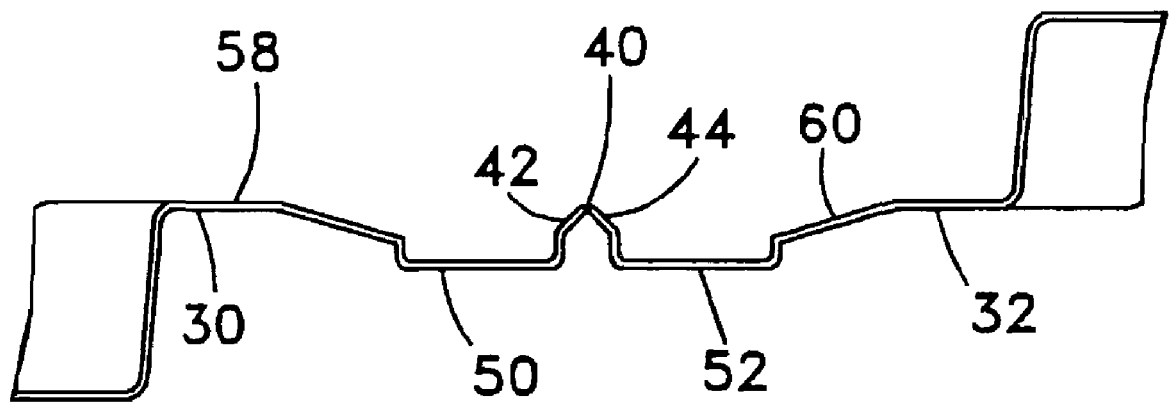
FIGS. 9(A)-(E) show a closing of the hinge of the present invention.
Figure 9B:
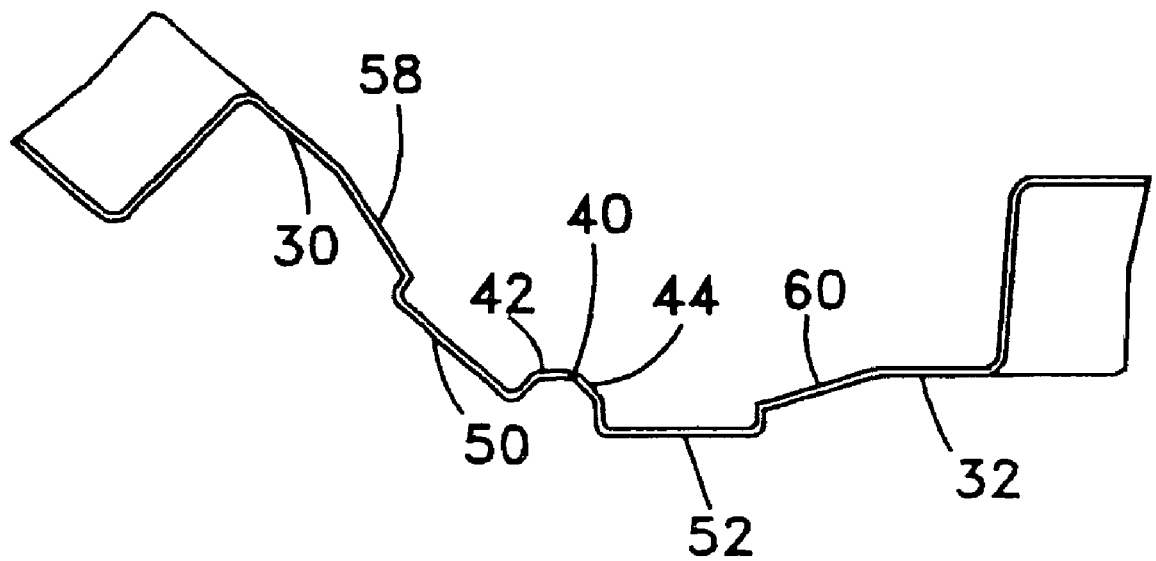
Figure 9C:
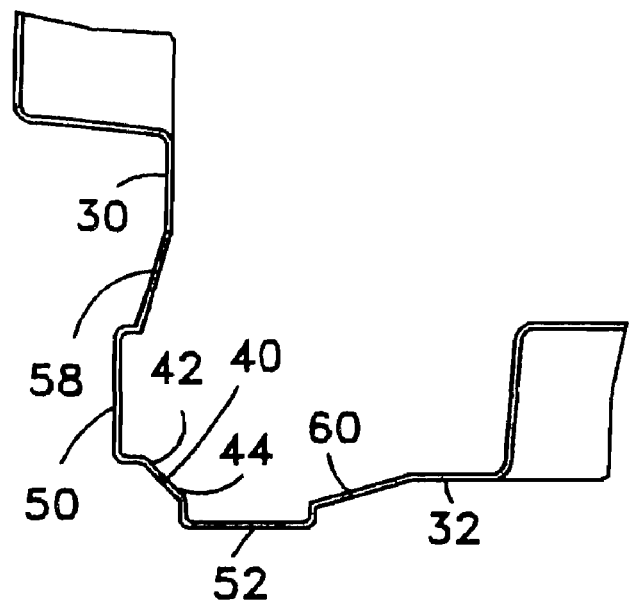
Figure 9D:
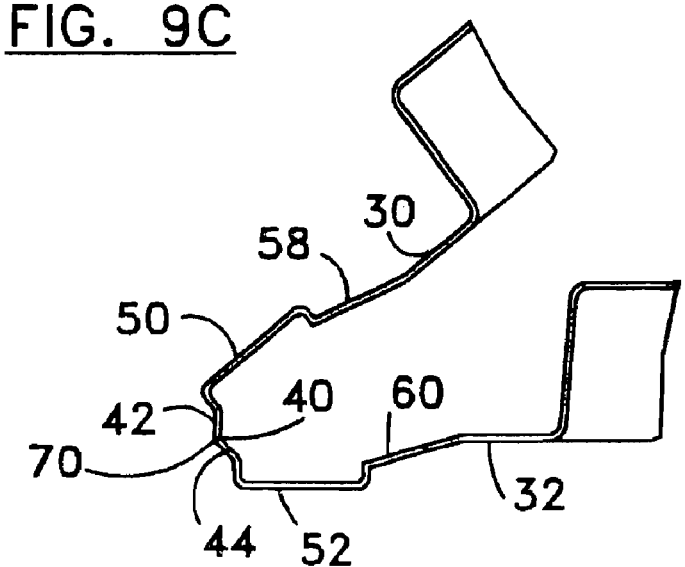
Figure 9E:
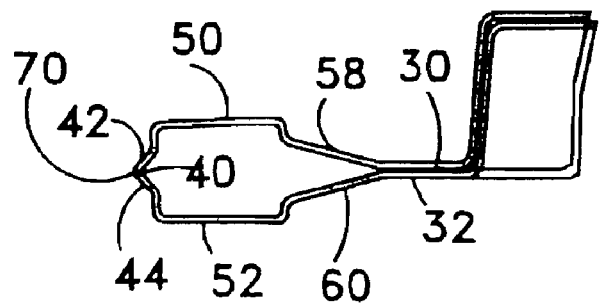

FIGS. 7(B) and 8(B) shows a single point hinge of the present invention in an "opened" and "closed" position.

The closed hinge in FIGS. 8(A) and 8(B) substantially closes about the hinge point 40. The hinge point 40 is generally the only hinging region. Of course, other angled regions of thermoplastic material will flex and bind under a load.

As can be seen in FIGS. 8(A), 8(B), and 9(A)-(E), the lid well 46 and the tray well 48 provide clearance for the hinge 12 to close and to prevent the touching of the chamfers 42, 44 or other hinge components. The hinge 12 closes such that only the lid trim flange 30 and the tray trim flange 32 are in contact. The touching of the chamfers or other hinge components may prevent proper closure or prevent the opened lid and tray from lying in a substantially flat position.

The lid vertical portion 38 and the tray vertical portion 39 may be approximately 0.040-0.080 inches apart for certain containers generally used by consumers. In a most preferred embodiment, the distance between the lid vertical portion 38 and the tray vertical portion 39 is approximately 0.060 inches.

The distance from the point hinge 40 to the bottom of the point space 49 is approximately 0.035-0.085 inches. In a preferred embodiment for consumer use, the point space is approximately 0.065 inches.

The plastic container incorporating the hinge of the present invention may be made from a variety of thermoplastics. It is preferred that the plastic is capable of heat forming and, after forming, the plastic will tolerate temperatures of approximately 240° Fahrenheit. The single point hinge of the present invention is intended to be microwave safe for the warming and heating of foods.

Thermoplastics for use with the single point hinge of the present invention include polyolefins such as polypropylene and polyethylene.

Preferred polypropylenes include random copoly polypropylene, copoly propylene, and homo polypropylene. It is preferred that the thermoplastic used in conjunction with the present invention have a melt flow range of approximately one to approximately five grams per ten minutes at 230° Celsius.

Preferred thermoplastics have a thickness of approximately 0.025 inches to approximately 0.040 inches, although thicker and thinner thermoplastics may be used with the single point hinge of the present invention.

The manufacturing of containers incorporating the hinge of the present invention involves thermoforming. The exact methods and details of thermoforming plastic containers are well known to one of ordinary skill in the art and need not be repeated in the present disclosure. Nonetheless, thermoforming generally involves the heating of the plastic, the molding of the plastic, the cooling of the plastic and the trimming of the plastic. The molding process may incorporate mold designs well known to those skilled in the art of thermoforming plastics. Typically a sheet of the plastic material, such as polypropylene, is heated and fed into the mold where the containers are formed by using vacuum, form air, and assist plugs to move the plastic against the forming surfaces for the forming cavity.

During the thermoforming of the single point hinge of the present invention, the plastic material may be heated to approximately 300° Fahrenheit before molding. During the molding process that forms the single point hinge of the present invention, a region of the hinge 12 at the hinge point 40 is thinned by a coining process or other thinning processes well known to one of ordinary skill in the art. This thinned region 70 is on the point space 49 side of the hinge 12. The coining process may incorporate the use of springs to provide the coining pressure. A particularly preferred spring is a Bellville™ spring. The springs provide for control of the amount of coining force applied by a coining anvil. At the hinge point 40, the plastic material in the thinned region 70 may be coined to approximately 0.003 inches to approximately 0.008 inches.

The single point hinge of the present invention maintains closure of the male locking rim and female locking rim in the area adjacent to the single point hinge. The single point hinge provides positive closure without the interference from portions of the hinge.

Unlike many perforated hinges, the single point hinge is durable and not prone to separation failure as some perforated hinges will tend to break. In the single point hinge, the only portions of the hinge that are touching each other are the lid trim flange and the tray trim flange. This reduces the likelihood for interference at the hinge.

The single point hinge of the present invention provides for a larger range of tolerances in the manufacturing process than many prior art hinge designs. This reduces the rejects that fail the manufacturing specifications. The single point hinge design is easier to manufacture since there are less angles than many other conventional hinges.

The terms "vertical" and "horizontal" have been used for purposes of general orientation and are not intended for absolute guidance, as it will be understood by one of ordinary skill in the art that it is the relative relationships between walls ands surfaces that are being described and not limited to a fixed vertical and horizontal orientation.

The materials forming the single point hinge and embodiments of the present invention may "relax" after the original thermoforming process into shapes approximating embodiments that are equivalents of the embodiments described and claimed herein. Moreover, through extended use, materials forming the single point hinge and embodiments of the present invention may be altered into equivalents of the embodiments described and claimed herein.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

What is claimed is:

1. A hinge for joining the lid and tray of a plastic container, the hinge comprising:
   a hinge point located at a point angle formed between a first chamfer and a second chamfer, the angle having a thinned region;
   the first chamfer connected to a lid well;

the lid well having a lid vertical portion, a lid horizontal well portion and a lid vertical well wall, the lid vertical portion being connected to the first chamfer;

the lid horizontal well portion being longer than either the lid vertical portion or the lid vertical well wall;

the second chamfer connected to a tray well;

the tray well having a tray vertical portion, a tray horizontal well portion and a tray vertical well wall, the tray vertical portion being connected to the second chamfer;

the tray horizontal well portion being longer than either the tray vertical portion or the tray vertical well wall;

a lid flange, the lid flange having a first end and second end;

the first end of the lid flange being configured for connection to the lid and the second end of the lid flange being connected to a lid well transition;

the lid well transition having a first end and a second end, the first end being connected to the lid flange and the second end being connected to the lid vertical wall;

a tray flange, the tray flange having a first end and a second end;

the first end of the tray flange being configured for connection to the tray and the second end of the tray flange being connected to a tray well transition;

the tray well transition having a first end and a second end, the first end being connected to the tray flange and the second end being connected to the tray vertical wall;

the lid flange and the tray flange forming a flange angle of between approximately 15 degrees to approximately 25 degrees at their respective points of connection with the lid well transition and the tray well transition;

wherein the hinge substantially closes about the hinge point and the hinge point is the only hinging region; and wherein when the hinge is closed the only surfaces of the hinge that are in contact are those of the lid flange and the tray flange.

2. The hinge of claim 1 wherein the hinge is thermoformed from the same sheet of plastic from which the lid and tray are thermoformed.

3. The hinge of claim 2 wherein the sheet of plastic contains polypropylene, polyethylene or both.

4. The hinge of claim 1 wherein the point angle ranges from approximately 60 degrees to 120 degrees.

5. The hinge of claim 1 wherein the point angle is approximately 90 degrees.

6. The hinge of claim 1 wherein the vertical well walls of the lid well and tray well are respectively connected to the lid horizontal well portion and the tray horizontal well portion at an angle between approximately 75 degrees and approximately 105 degrees.

7. The hinge of claim 1 wherein the vertical well walls of the lid well and tray well are respectively connected to the lid horizontal well portion and tray horizontal well portion at an angle of approximately 90 degrees.

8. The hinge of claim 1 wherein the lid flange is substantially parallel to the lid horizontal well portion and the tray flange is substantially parallel to the tray horizontal well portion.

9. The hinge of claim 1 wherein the lid flange and the tray flange form a flange angle of approximately 15 degrees at their respective points of connection with the lid well transition and the tray well transition.

10. The hinge of claim 1 wherein the point angle is thinned to a thickness of approximately 0.003 inches to approximately 0.008 inches.

* * * * *